US011051304B2

United States Patent
Lee et al.

(10) Patent No.: US 11,051,304 B2
(45) Date of Patent: Jun. 29, 2021

(54) METHOD AND APPARATUS FOR SELECTING CARRIER FOR SIDELINK TRANSMISSION IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Jongwoo Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/626,314

(22) PCT Filed: Jul. 24, 2018

(86) PCT No.: PCT/KR2018/008360
§ 371 (c)(1),
(2) Date: Dec. 23, 2019

(87) PCT Pub. No.: WO2019/022477
PCT Pub. Date: Jan. 31, 2019

(65) Prior Publication Data
US 2020/0120674 A1 Apr. 16, 2020

Related U.S. Application Data

(60) Provisional application No. 62/536,974, filed on Jul. 25, 2017.

(51) Int. Cl.
*H04W 76/27* (2018.01)
*H04W 72/04* (2009.01)
(Continued)

(52) U.S. Cl.
CPC ....... *H04W 72/0453* (2013.01); *H04W 72/02* (2013.01); *H04W 88/04* (2013.01); *H04W 92/18* (2013.01)

(58) Field of Classification Search
CPC ......... H04W 92/18; H04W 4/40; H04W 4/44; H04W 72/0453; H04L 5/001
(Continued)

(56) References Cited

U.S. PATENT DOCUMENTS

2010/0265905 A1* 10/2010 Lee ................. H04L 5/0037
370/329
2013/0250879 A1* 9/2013 Ng ................. H04B 7/0689
370/329
(Continued)

FOREIGN PATENT DOCUMENTS

EP 3051736 8/2016

OTHER PUBLICATIONS

PCT International Application No. PCT/KR2018/008360, International Search Report dated Oct. 24, 2018, 2 pages.
(Continued)

*Primary Examiner* — Asad M Nawaz
*Assistant Examiner* — Jason A Harley
(74) *Attorney, Agent, or Firm* — Lee Hong Degerman Kang Waimey

(57) ABSTRACT

A method and apparatus for selecting a carrier for a sidelink communication in a wireless communication system is provided. A user equipment (UE) receives an indication of an aggregated set of carriers among multiple carriers from the network. The aggregated set of carriers may be aggregated based on a destination of the sidelink communication. The UE selects a carrier among the aggregated set of carriers,
(Continued)

selects a resource of the selected carrier, and performs the sidelink communication by using the selected resource of the selected carrier.

13 Claims, 8 Drawing Sheets

(51) Int. Cl.
*H04W 28/02* (2009.01)
*H04L 5/00* (2006.01)
*H04W 72/02* (2009.01)
*H04W 88/04* (2009.01)
*H04W 92/18* (2009.01)

(58) Field of Classification Search
USPC .......................................................... 370/252
See application file for complete search history.

(56) References Cited

U.S. PATENT DOCUMENTS

| | | | |
|---|---|---|---|
| 2017/0118671 A1 | 4/2017 | Lee et al. | |
| 2019/0116609 A1* | 4/2019 | Feng | H04W 4/46 |
| 2019/0253919 A1* | 8/2019 | Wu | H04W 72/1263 |
| 2019/0253926 A1* | 8/2019 | Kim | H04W 28/0278 |
| 2019/0387377 A1* | 12/2019 | Zhang | H04W 4/44 |
| 2020/0059962 A1* | 2/2020 | Tejedor | H04W 16/14 |
| 2020/0099481 A1* | 3/2020 | Pan | H04W 76/30 |
| 2020/0120674 A1* | 4/2020 | Lee | H04W 72/02 |
| 2020/0322910 A1* | 10/2020 | Zhang | H04W 56/002 |

OTHER PUBLICATIONS

Intel, "On Carrier Aggregation for LTE V2V Sidelink Communication", 3GPP TSG RAN WG1 Meeting #88bis, R1-1705446, Apr. 2017, 11 pages.

3rd Generation Partnership Project (3GPP), "Technical Specification Group Radio Access Network; Evolved Universal Terrestrial Radio Access (E-UTRA); Radio Resource Control (RRC); Protocol specification (Release 14)," 3GPP TS 36.331 V14.3.0, Jun. 2017, 747 pages.

ZTE, "Considering CA on PC5 carrier", 3GPP TSG RAN WG1 Meeting #89, R1-1707211, May 2017, 5 pages.

* cited by examiner

METHOD AND APPARATUS FOR SELECTING CARRIER FOR SIDELINK TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2018/008360, filed on Jul. 24, 2018, which claims the benefit of U.S. Provisional Application No. 62/536,974, filed on Jul. 25, 2017, the contents of which are all hereby incorporated by reference herein in their entirety.

TECHNICAL FIELD

The present invention relates to wireless communications, and more particularly, to a method and apparatus for selecting a carrier for sidelink transmission in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

SUMMARY

Carrier aggregation (CA) in sidelink for V2X sidelink communication may be supported. In this case, a method for selecting a carrier among aggregated carriers may be required.

In an aspect, a method for selecting a carrier for a sidelink communication by a user equipment (UE) in a wireless communication system is provided. The method includes receiving an indication of an aggregated set of carriers, which is based on a destination of the sidelink communication, among multiple carriers from the network, selecting a carrier among the aggregated set of carriers, selecting a resource of the selected carrier, and performing the sidelink communication by using the selected resource of the selected carrier.

In another aspect, a user equipment (UE) in a wireless communication system is provided. The UE includes a memory, a transceiver, and a processor, operably coupled to the memory and the transceiver, that controls the transceiver to receive an indication of an aggregated set of carriers, which is based on a destination of the sidelink communication, among multiple carriers from the network, selects a carrier among the aggregated set of carriers, selects a resource of the selected carrier, and controls the transceiver to perform the sidelink communication by using the selected resource of the selected carrier.

A carrier can be selected among aggregated carriers according to a destination, so that sidelink transmission can be performed on the selected carrier efficiently.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
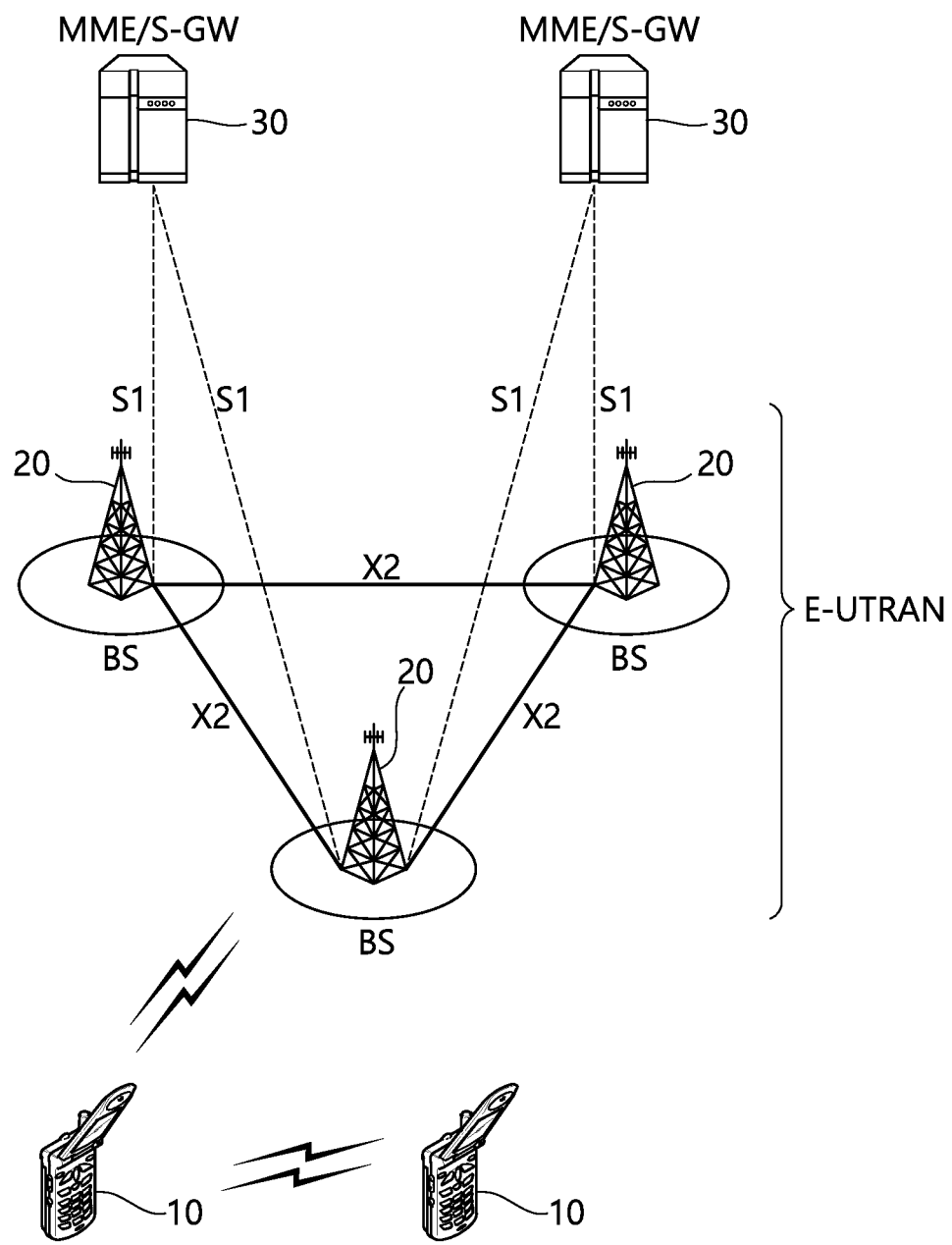
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
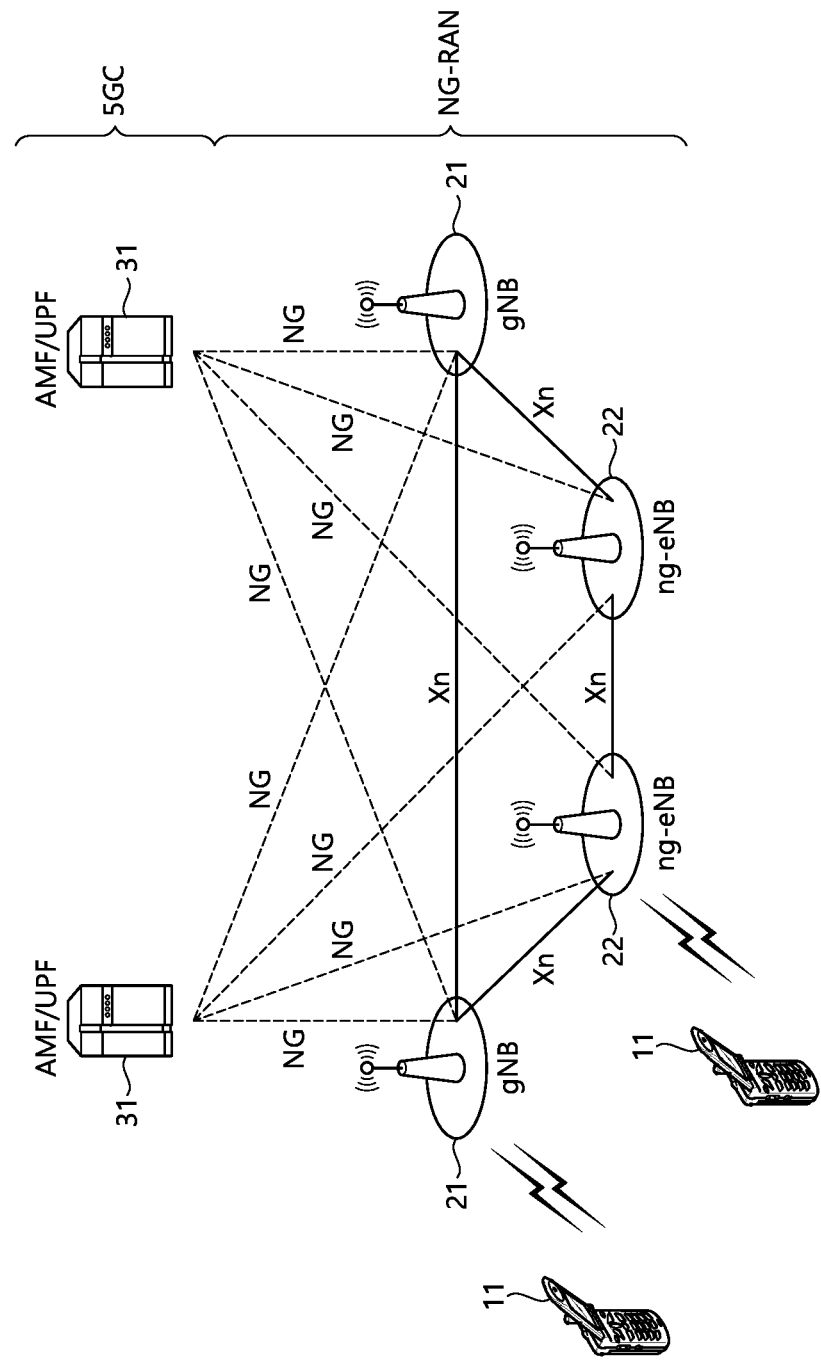
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
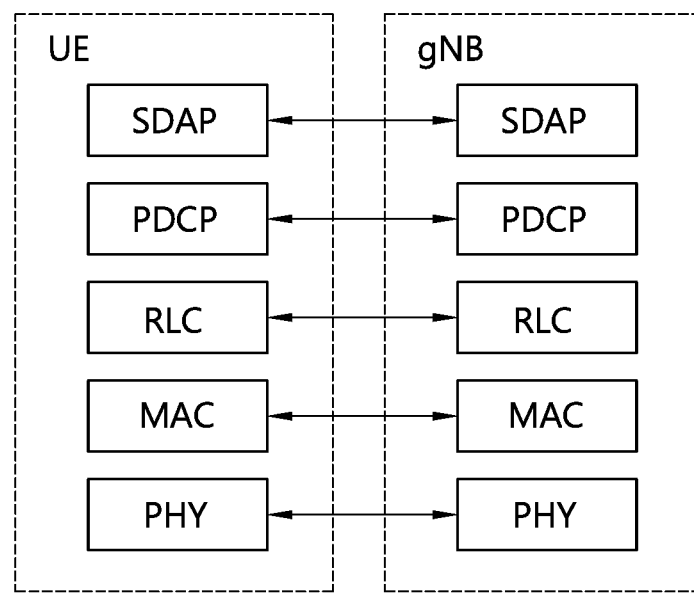
FIG. 3 shows a block diagram of a user plane protocol stack to which technical features of the present invention can be applied.
Figure 4:
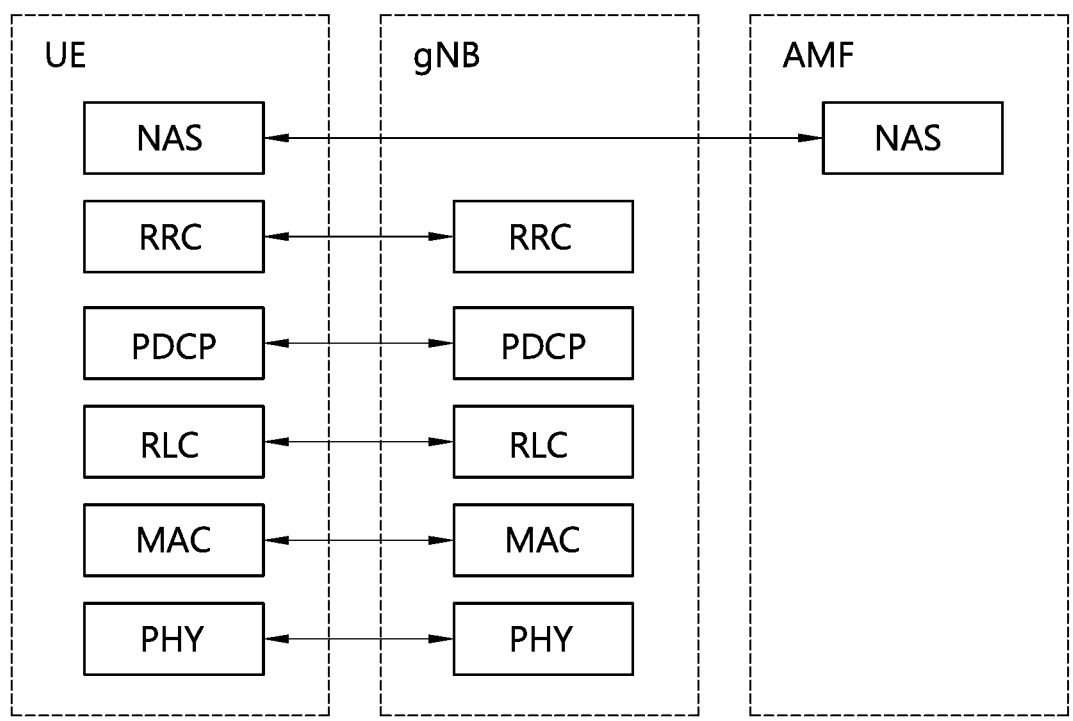
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to 01-DM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Sidelink is described. Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

A UE is considered in-coverage for sidelink communication whenever it detects a cell on a public safety ProSe carrier. If the UE is out of coverage for sidelink communication, it can only use the Mode 2. If the UE is in coverage for sidelink communication, it may use the Mode 1 or the Mode 2 as per BS configuration. If the UE is in coverage for sidelink communication, it shall use only the resource allocation mode indicated by BS configuration, unless one of the exceptional cases occurs. When an exceptional case occurs, the UE is allowed to use the Mode 2 temporarily, even though it was configured to use the Mode 1. Resource pool to be used during exceptional case may be provided by BS.

A set of transmission and reception resource pools for SCI when the UE is out of coverage for sidelink communication is pre-configured in the UE. The resource pools for SCI when the UE is in coverage for sidelink communication are configured as follows. The resource pools used for reception are configured by the BS via RRC, in broadcast signaling. The resource pool used for transmission is configured by the BS via RRC, in dedicated or broadcast signaling, if the Mode 2 is used. The resource pool used for transmission is configured by the BS via RRC, in dedicated signaling if the Mode 1 is used. In this case, the BS schedules the specific resource(s) for SCI transmission within the configured reception pools.

A set of transmission and reception resource pools for data when the UE is out of coverage for sidelink communication is pre-configured in the UE. The resource pools for data when the UE is in coverage for sidelink communication are configured as follows. The resource pools used for transmission and reception are configured by the BS via RRC, in dedicated or broadcast signaling, if the Mode 2 is used. There is no resource pool for transmission and reception if the Mode 1 is used.

V2X services and V2X sidelink communication is described. V2X services can consist of the following four different types, i.e. vehicle-to-vehicle (V2V), vehicle-to-infrastructure (V2I), vehicle-to-nomadic (V2N) and vehicle-to-pedestrian (V2P). V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

For V2X sidelink transmission, during handover, transmission resource pool configurations including exceptional transmission resource pool for the target cell can be signaled in the handover command to reduce the transmission interruption. In this way, the UE may use the transmission sidelink resource pools of the target cell before the handover is completed, as long as either synchronization is performed with the target cell in case BS is configured as synchronization source or synchronization is performed with global navigation satellite system (GNSS) in case GNSS is configured as synchronization source. If the exceptional transmission resource pool is included in the handover command, the UE starts using randomly selected resources from the exceptional transmission resource pool starting from the reception of handover command. If the UE is configured with the Mode 3 in the handover command, the UE continues to use the exceptional transmission resource pool while the timer associated with handover is running. If the UE is configured with the Mode 4 in the target cell, the UE continues to use the exceptional transmission resource pool until the sensing results on the transmission resource pools for the Mode 4 are available. For exceptional cases (e.g. during radio link failure (RLF), during transition from RRC_IDLE to RRC_CONNECTED or during change of dedicated sidelink resource pools within a cell), the UE may select resources in the exceptional pool provided in serving cell's SIB21 based on random selection, and uses them temporarily. During cell reselection, the RRC_IDLE UE may use the randomly selected resources from the exceptional transmission resource pool of the reselected cell until the sensing results on the transmission resource pools for the Mode 4 are available.

In order to avoid interruption time in receiving V2X messages due to delay in acquiring reception pools broadcasted from the target cell, synchronization configuration and reception resource pool configuration for the target cell can be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier. If the UE that is authorized for V2X sidelink communication is in-coverage for V2X sidelink communication, it may use the Mode 3 or the Mode 4 as per BS configuration. A set of transmission and reception resource pools when the UE is out of coverage for V2X sidelink communication may be pre-configured in the UE. V2X sidelink communication resources are not shared with other non-V2X data transmitted over sidelink.

An RRC_CONNECTED UE may send a sidelink UE information message to the serving cell if it is interested in V2X sidelink communication transmission in order to request sidelink resources.

If the UE is configured by higher layers to receive V2X sidelink communication and V2X sidelink reception resource pools are provided, the UE receives on those provided resources.

Reception of sidelink V2X communication in different carriers/PLMNs can be supported by having multiple receiver chains in the UE.

For sidelink SPS, maximum 8 SPS configurations with different parameters can be configured by BS and all SPS configurations can be active at the same time. The activation/deactivation of SPS configuration is signalled via PDCCH by BS. The existing logical channel prioritization based on PPPP is used for sidelink SPS.

UE assistance information can be provided to BS. Reporting of UE assistance information is configured by BS for V2X sidelink communication. The UE assistance information used for V2X sidelink communication includes traffic characteristic parameters (e.g. a set of preferred expected SPS interval, timing offset with respect to subframe 0 of the system frame number (SFN) 0, PPPP and maximum transport block (TB) size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

For controlling channel utilization, the network is able to indicate how the UE adapts its transmission parameters for each transmission pool depending on the channel busy ratio (CBR). The UE measures all the configured transmission pools including exceptional pool. Only data pool is measured for the case scheduling assignment (SA) pool and data pool resources are located adjacently, while SA pool and data pool is measured separately for the case SA pool and data pool are located non-adjacently.

A UE in RRC_CONNECTED can be configured to report CBR measurement results. For CBR reporting, periodic reporting and event triggered reporting are supported. Two new reporting events defined only for the data pool are introduced for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. The exemplary adapted transmission parameters include maximum transmission power, range of the number of retransmission per TB, range of physical sidelink shared channel (PSSCH) resource block number, range of MCS, maximum limit on channel occupancy ratio. The transmission parameter adaption applies to all transmission pools including exceptional pool.

Sidelink transmission and/or reception resources including exceptional pool for different frequencies for the Mode 3 and Mode 4 may be provided. The sidelink resources for different frequencies can be provided via dedicated signaling, SIB21 and/or pre-configuration. The serving cell may indicate to the UE only the frequency on which the UE may acquire the sidelink resource configuration. If multiple frequencies and associated resource information are provided, it is up to UE implementation to select the frequency among the provided frequencies. The UE shall not use pre-configured transmission resource if the UE detects a cell providing resource configuration or inter-carrier resource configuration for V2X sidelink communication. Frequencies which may provide V2X sidelink communication resource configuration or cross-carrier configuration can be pre-configured. The RRC_IDLE UE may prioritize the frequency that provides resource configuration for V2X sidelink communication for other carrier during cell reselection.

If the UE supports multiple transmission chains, it may simultaneously transmit on multiple carriers via PC5. For the case where multiple frequencies for V2X are supported, a mapping between service types and V2X frequencies is configured by upper layers. The UE should ensure a service to be transmitted on the corresponding frequency.

The UE may receive the V2X sidelink communication of other PLMNs. The serving cell can indicate to the UE the RX resource configuration for inter-PLMN operation directly or only the frequency on which the UE may acquire the inter-PLMN sidelink resource configuration. Sidelink transmission in other PLMNs is not allowed.

When UL transmission overlaps in time domain with V2X sidelink transmission in the same frequency, the UE prioritizes the sidelink transmission over the UL transmission if the PPPP of sidelink MAC PDU is lower than a (pre)configured PPPP threshold. When UL transmission overlaps in time domain with sidelink transmission in different frequency, the UE may prioritize the sidelink transmission over the UL transmission or reduce UL transmission power if the PPPP of sidelink MAC PDU is lower than a (pre)configured PPPP threshold. However, if UL transmission is prioritized by upper layer or RACH procedure is performed, the UE prioritizes UL transmission over any V2X sidelink transmission (i.e. irrespectively of the sidelink MAC PDU's PPPP).

Detailed operation by MAC sublayer regarding V2X sidelink communication transmission is described. In order to transmit on the sidelink shared channel (SL-SCH), the MAC entity must have at least one sidelink grant.

Sidelink grants are selected as follows for sidelink communication:

1> if the MAC entity is configured to receive a single sidelink grant dynamically on the PDCCH and more data is available in sidelink traffic channel (STCH) than can be transmitted in the current SC period, the MAC entity shall:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

2> clear the configured sidelink grant at the end of the corresponding SC Period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC Period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:

3> select that pool of resources for use;

2> else, if configured by upper layers to use multiple pools of resources:

3> select a pool of resources for use from the pools of resources configured by upper layers whose associated priority list includes the priority of the highest priority of the sidelink logical channel in the MAC PDU to be transmitted;

2> randomly select the time and frequency resources for SL-SCH and SCI of a sidelink grant from the selected resource pool. The random function shall be such that each of the allowed selections can be chosen with equal probability;

2> use the selected sidelink grant to determine the set of subframes in which transmission of SCI and transmission of first transport block occur;

2> consider the selected sidelink grant to be a configured sidelink grant occurring in those subframes starting at the beginning of the first available SC Period which starts at least 4 subframes after the subframe in which the sidelink grant was selected;

2> clear the configured sidelink grant at the end of the corresponding SC Period.

Sidelink grants are selected as follows for V2X sidelink communication:

1> if the MAC entity is configured to receive a sidelink grant dynamically on the PDCCH and data is available in STCH, the MAC entity shall:

2> use the received sidelink grant to determine the number of HARQ retransmissions and the set of subframes in which transmission of SCI and SL-SCH occur;

2> consider the received sidelink grant to be a configured sidelink grant;

1> else, if the MAC entity is configured by upper layers to transmit based on sensing using a pool of resources, the MAC entity selects to create a configured sidelink grant corresponding to transmissions of multiple MAC PDUs, and data is available in STCH, the MAC entity shall for each Sidelink process configured for multiple transmissions based on sensing:

2> if SL_RESOURCE_RESELECTION_COUNTER=0 and the MAC entity randomly selects, with equal probability, a value in the interval [0, 1] which is above the probability configured by upper layers in probResourceKeep; or 2> if the configured sidelink grant cannot accommodate a RLC SDU by using the maximum allowed MCS configured by upper layers in maxMCS-PSSCH and the MAC entity selects not to segment the RLC SDU; or 2> if a pool of resources is configured or reconfigured by upper layers:

3> clear the configured sidelink grant, if available;

3> randomly select, with equal probability, an integer value in the interval [5, 15] and set SL_RESOURCE_RESELECTION_COUNTER to the selected value;

3> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;

3> select one of the allowed values configured by upper layers in restrictResourceReservationPeriod and set the resource reservation interval by multiplying 100 with the selected value;

3> randomly select one time and frequency resource from the resources indicated by the physical layer. The random function shall be such that each of the allowed selections can be chosen with equal probability;

3> use the randomly selected resource to select a set of periodic resources spaced by the resource reservation interval for transmission opportunities of SCI and SL-SCH corresponding to the number of transmission opportunities of MAC PDUs;

3> if the number of HARQ retransmissions is equal to 1 and there are available resources left in the resources indicated by the physical layer that meet the conditions for more transmission opportunities:

4> randomly select one time and frequency resource from the available resources. The random function shall be such that each of the allowed selections can be chosen with equal probability;

4> use the randomly selected resource to select a set of periodic resources spaced by the resource reservation interval for the other transmission opportunities of SCI and SL-SCH corresponding to the number of retransmission opportunities of the MAC PDUs;

4> consider the first set of transmission opportunities as the new transmission opportunities and the other set of transmission opportunities as the retransmission opportunities;

4> consider the set of new transmission opportunities and retransmission opportunities as the selected sidelink grant.

3> else:

4> consider the set as the selected sidelink grant;

3> use the selected sidelink grant to determine the set of subframes in which transmissions of SCI and SL-SCH occur;

3> consider the selected sidelink grant to be a configured sidelink grant;

2> else if SL_RESOURCE_RESELECTION_COUNTER=0 and the MAC entity randomly selects, with equal probability, a value in the interval [0, 1] which is less than or equal to the probability configured by upper layers in probResourceKeep:

3> clear the configured sidelink grant, if available;

3> randomly select, with equal probability, an integer value in the interval [5, 15] and set SL_RESOURCE_RESELECTION_COUNTER to the selected value;

3> use the previously selected sidelink grant for the number of transmissions of the MAC PDUs with the resource reservation interval to determine the set of subframes in which transmissions of SCI and SL-SCH occur;

3> consider the selected sidelink grant to be a configured sidelink grant;

1> else, if the MAC entity is configured by upper layers to transmit based on either sensing or random selection using a pool of resources, the MAC entity selects to create a configured sidelink grant corresponding to transmission(s) of a single MAC PDU, and data is available in STCH, the MAC entity shall for a Sidelink process:

2> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;

2> if transmission based on random selection is configured by upper layers:

3> randomly select the time and frequency resources for one transmission opportunity of SCI and SL-SCH from the resource pool. The random function shall be such that each of the allowed selections can be chosen with equal probability;

2> else:

3> randomly select the time and frequency resources for one transmission opportunity of SCI and SL-SCH from the resource pool indicated by the physical layer. The random function shall be such that each of the allowed selections can be chosen with equal probability;

2> if the number of HARQ retransmissions is equal to 1:

3> if transmission based on random selection is configured by upper layers and there are available resources that meet the conditions for one more transmission opportunity:

4> randomly select the time and frequency resources for the other transmission opportunity of SCI and SL-SCH corresponding to additional transmission of the MAC PDU from the available resources. The random function shall be such that each of the allowed selections can be chosen with equal probability;

3> else, if transmission based on sensing is configured by upper layers and there are available resources, except the resources already excluded by the physical layer, that meet the conditions for one more transmission opportunity:

4> randomly select the time and frequency resources for the other transmission opportunity of SCI and SL-SCH corresponding to additional transmission of the MAC PDU from the available resources. The random function shall be such that each of the allowed selections can be chosen with equal probability;

3> consider a transmission opportunity which comes first in time as the new transmission opportunity and a transmission opportunity which comes later in time as the retransmission opportunity;

3> consider both of the transmission opportunities as the selected sidelink grant;

2> else:

3> consider the transmission opportunity as the selected sidelink grant;

2> use the selected sidelink grant to determine the subframes in which transmission(s) of SCI and SL-SCH occur;

2> consider the selected sidelink grant to be a configured sidelink grant;

The MAC entity shall for each subframe:

1> if the MAC entity has a configured sidelink grant occurring in this subframe:

2> if the configured sidelink grant corresponds to transmission of SCI:

3> instruct the physical layer to transmit SCI corresponding to the configured sidelink grant;

3> for V2X sidelink communication, deliver the configured sidelink grant and the associated HARQ information to the Sidelink HARQ Entity for this subframe;

2> else if the configured sidelink grant corresponds to transmission of first transport block for sidelink communication:

3> deliver the configured sidelink grant and the associated HARQ information to the Sidelink HARQ Entity for this subframe.

Sidelink communication and V2X sidelink communication related identities are described. The following identities are used for sidelink communication and V2X sidelink communication.

(1) Source layer-2 ID (may be referred to as Source ID): The Source Layer-2 ID identifies the sender of the data in sidelink communication and V2X sidelink communication. The Source Layer-2 ID is 24 bits long and is used together with Destination Layer-2 ID and logical channel ID (LCID) for identification of the RLC UM entity and PDCP entity in the receiver.

(2) Destination Layer-2 ID (may be referred to as Destination ID): The Destination Layer-2 ID identifies the target of the data in sidelink communication and V2X sidelink communication. For sidelink communication, the Destination Layer-2 ID is 24 bits long and is split in the MAC layer into two bit strings. One bit string is the least significant bit (LSB) part (8 bits) of Destination Layer-2 ID and forwarded to physical layer as Group Destination ID. This identifies the target of the intended data in sidelink control information and is used for filtering of packets at the physical layer. Second bit string is the most significant bit (MSB) part (16 bits) of the Destination Layer-2 ID and is carried within the MAC header. This is used for filtering of packets at the MAC layer. In case of V2X sidelink communication, Destination Layer-2 ID is not split and is carried within the MAC header.

No AS signaling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, the ProSe UE ID provided by higher layer is used directly as the Source Layer-2 ID or the Destination Layer-2 ID in the MAC layer. In case of V2X sidelink communication, higher layer provides Source Layer-2 ID and Destination Layer-2 ID.

SPS is described in detail. As mentioned above, resources allocated by SPS may be used for V2X sidelink communication.

In DL, E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its cell radio network temporary identity (C-RNTI) on the PDCCH(s), a DL transmission according to the semi-persistent allocation that the UE has been assigned in the TTI is assumed. Otherwise, in the subframes where the UE has semi-persistent DL resource, if the UE finds its C-RNTI on the PDCCH(s), the PDCCH allocation overrides the semi-persistent allocation for that TTI and the UE does not decode the semi-persistent resources.

In UL, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined physical resource blocks (PRBs) according to the pre-defined modulation and coding scheme (MCS). Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Table 1 shows SPS-Config information element (IE). The IE SPS-Config is used to specify the SPS configuration.

TABLE 1

```
-- ASN1START
SPS-Config ::= SEQUENCE {
      semiPersistSchedC-RNTI              C-RNTI
          OPTIONAL,              -- Need OR
      sps-ConfigDL                        SPS-ConfigDL
          OPTIONAL,              -- Need ON
      sps-ConfigUL                        SPS-ConfigUL
          OPTIONAL               -- Need ON
}
SPS-Config-v1430 ::= SEQUENCE {
      ul-SPS-V-RNTI-r14                   C-RNTI
          OPTIONAL,              -- Need OR
      sl-SPS-V-RNTI-r14                   C-RNTI
          OPTIONAL,              -- Need OR
      sps-ConfigUL-ToAddModList-r14       SPS-ConfigUL-ToAddModList-
r14   OPTIONAL,  -- Need ON
      sps-ConfigUL-ToReleaseList-r14      SPS-ConfigUL-ToReleaseList-
r14   OPTIONAL,  -- Need ON
      sps-ConfigSL-ToAddModList-r14       SPS-ConfigSL-ToAddModList-
r14   OPTIONAL,  -- Need ON
      sps-ConfigSL-ToReleaseList-r14      SPS-ConfigSL-ToReleaseList-r14
          OPTIONAL   -- Need ON
}
SPS-ConfigUL-ToAddModList-r14 ::= SEQUENCE (SIZE (1..maxConfigSPS-r14)) OF
SPS-ConfigUL
SPS-ConfigUL-ToReleaseList-r14 ::= SEQUENCE (SIZE (1..maxConfigSPS-r14)) OF
SPS-ConfigIndex-r14
SPS-ConfigSL-ToAddModList-r14 ::= SEQUENCE (SIZE (1..maxConfigSPS-r14)) OF
SPS-ConfigSL-r14
SPS-ConfigSL-ToReleaseList-r14 ::= SEQUENCE (SIZE (1..maxConfigSPS-r14)) OF
SPS-ConfigIndex-r14
SPS-ConfigDL::=       CHOICE{
      release                             NULL,
      setup                               SEQUENCE {
          semiPersistSchedIntervalDL      ENUMERATED {
      sf10, sf20, sf32, sf40, sf64, sf80,
      sf128, sf160, sf320, sf640, spare6,
      spare5, spare4, spare3, spare2,
      spare1},
          numberOfConfSPS-Processes       INTEGER (1..8),
          n1PUCCH-AN-PersistentList       N1PUCCH-AN-
PersistentList,
          ...,
          [[   twoAntennaPortActivated-r10   CHOICE {
                    release
NULL,
                    setup
SEQUENCE {
                          n1PUCCH-AN-PersistentListP1-r10
N1PUCCH-AN-PersistentList
                    }
              }                           OPTIONAL   -- Need
ON
          ]]
      }
}
SPS-ConfigUL ::=     CHOICE {
      release                             NULL,
      setup                               SEQUENCE {
          semiPersistSchedIntervalUL      ENUMERATED {
      sf10, sf20, sf32, sf40, sf64, sf80,
      sf128, sf160, sf320, sf640, sf1-v1430,
      sf2-v1430, sf3-v1430, sf4-v1430, sf5-v1430,
      spare1},
          implicitReleaseAfter            ENUMERATED  {e2,
e3, e4, e8},
          p0-Persistent                      SEQUENCE {
                p0-NominalPUSCH-Persistent   INTEGER  (-
126..24),
                p0-UE-PUSCH-Persistent
      INTEGER (-8..7)
          }             OPTIONAL,
                                          -- Need OP
          twoIntervalsConfig
      ENUMERATED {true }          OPTIONAL,  -- Cond TDD
          ...,
          [[   p0-PersistentSubframeSet2-r12   CHOICE {
                    release
NULL,
```

TABLE 1-continued

```
                    setup
    SEQUENCE {
                            p0-NominalPUSCH-PersistentSubframeSet2-r12
        INTEGER (-126..24),
                            p0-UE-PUSCH-PersistentSubframeSet2-r12
            INTEGER (-8..7)
                }
            }
                                        OPTIONAL   -- Need ON
        ]],
        [[    numberOfConfUlSPS-Processes-r13
    INTEGER (1..8)             OPTIONAL      -- Need OR
        ]],
        [[    fixedRV-NonAdaptive-r14
    ENUMERATED {true}          OPTIONAL,     -- Need OR
            sps-ConfigIndex-r14
    SPS-ConfigIndex-r14        OPTIONAL,     -- Need OR
            semiPersistSchedIntervalUL-v1430
    ENUMERATED {
    sf50, sf100, sf200, sf300, sf400, sf500,
    sf600, sf700, sf800, sf900, sf1000, spare5,
    spare4, spare3, spare2, spare1}   OPTIONAL   -- Need OR
        ]]
        }
}
SPS-ConfigSL-r14 ::= SEQUENCE {
    sps-ConfigIndex-r14                 SPS-ConfigIndex-r14,
    semiPersistSchedIntervalSL-r14 ENUMERATED {
                                                    sf20,
sf50, sf100, sf200, sf300, sf400,
                                                    sf500,
sf600, sf700, sf800, sf900, sf1000,
                                                    spare4,
spare3, spare2, spare1}
}
SPS-ConfigIndex-r14 ::=        INTEGER (1..maxConfigSPS-r14)
N1PUCCH-AN-PersistentList ::=  SEQUENCE (SIZE (1..4)) OF INTEGER
(0..2047)
-- ASN1STOP
```

A problem of the prior art or a problem to be solved is described. According to the prior art, a resource pool is configured only on a single carrier. The RRC layer of the UE (hereinafter, simply UE RRC) selects a resource pool on a single carrier. Then, the MAC layer of the UE (hereinafter, simply UE MAC) performs resource (re-)selection on the selected pool, and performs sidelink transmission by using the selected resource.

It has been discussed to introduce carrier aggregation (CA) in sidelink for V2X sidelink communication. CA in sidelink for V2X sidelink communication may apply to both in coverage UEs and out of coverage UEs. In CA in sidelink for V2X sidelink communication, each resource pool (pre) configured for V2X sidelink communication transmission or reception may be associated to a single carrier.

If CA in sidelink for V2X sidelink communication is introduced, the UE may perform parallel transmissions on different carriers. Accordingly, the UE may select multiple carriers independently. In this case, transmitting UEs should configure/select multiple carriers, which cause a burden to the transmitting UEs. Further, receiving UEs may need to receive many carriers, so that the receiving UEs should increase reception capability and power consumption. Accordingly, a method for selecting carriers depending on specific condition may be required.

Hereinafter, a method for selecting sidelink carriers for resource pools or SPS configurations is described according to embodiments of the present invention.

According to an embodiment of the present invention, the network indicates to the UE which resource pools can be aggregated in sidelink or which carriers of resource pools can be aggregated in sidelink. More specifically, the network may indicate the aggregated carriers to the UE. The aggregated carriers may be indicated per each resource pool, per each service (e.g. V2V, V2I, V2P), per each frequency band, or per each band combination. Or, the network may indicate the aggregated resource pools to the UE. The aggregated resource pools may be indicated per each service (e.g. V2V, V2I, V2P), per each frequency band, or per each band combination. The network may indicate the aggregated carriers or aggregated resource pools separately for reception and transmission. The network may indicate the aggregated carriers or aggregated resource pools via system information and/or a dedicated signaling.

Furthermore, the aggregated carriers or the aggregated resource pools may be mapped to an ID, such as Destination ID (e.g. Destination Layer 2 ID), Source ID (e.g. Source Layer 2 ID), or UE Identity. The network may indicate which aggregated carriers or aggregated resource pools are mapped to at least one of Destination ID (e.g. Destination Layer 2 ID), Source ID (e.g. Source Layer 2 ID), or UE Identity. For example, the network may indicate which aggregated carriers or aggregated resource pools are mapped to a specific destination ID.

According to another embodiment of the present invention, if multiple SPS configurations are used, the network indicates to the UE which SPS configurations can be aggregated in sidelink or which carriers of SPS configurations can be aggregated in sidelink. More specifically, the network may indicate the aggregated carriers to the UE. The aggregated carriers may be indicated per each SPS configuration, per each service (e.g. V2V, V2I, V2P), per each frequency band, or per each band combination. Or, the network may indicate the aggregated SPS configurations to the UE. The aggregated SPS configurations may be indicated per each service (e.g. V2V, V2I, V2P), per each frequency band, or per each band combination. The network may indicate the aggregated carriers or aggregated SPS configurations separately for reception and transmission. The network may indicate the aggregated carriers or aggregated SPS configurations via system information and/or a dedicated signaling.

Furthermore, the aggregated carriers or the aggregated SPS configurations may be mapped to an ID, such as Destination ID (e.g. Destination Layer 2 ID), Source ID (e.g. Source Layer 2 ID), or UE Identity. The network may indicate which aggregated carriers or aggregated SPS configurations are mapped to one of Destination ID (e.g. Destination Layer 2 ID), Source ID (e.g. Source Layer 2 ID), or UE Identity. For example, the network may indicate which aggregated carriers or aggregated SPS configurations are mapped to a specific destination ID.

Upon receiving indication of the aggregated carriers for resource pools or aggregated SPS configurations from the network, the UE selects one or more carriers for resource pools or one or more SPS configurations, among the indicated aggregated carriers for resource pools or aggregated SPS configurations. The UE may select one or more carriers for resource pools or one or more SPS configurations based on one or more of the following aspects.

UE capability of the UE (e.g. supported band combinations)
UE Identity allocated to the UE (e.g. C-RNTI or SAE temporary mobile subscriber identity (S-TMSI))
Source ID allocated to the UE or selected by the UE
Destination ID allocated to the UE or selected by the UE
Congestion level (e.g. CBR), of the indicated carriers.

The UE selects sidelink resources on the selected carrier(s) for resource pools or the selected SPS configuration(s). For sidelink transmission, the UE transmits SCI and/or data on the selected sidelink resources. For sidelink reception, the UE monitors or receives SCI on the selected carrier(s) for resource pools or the selected SPS configuration(s). Then, the UE receives data on the carrier(s) or the SPS configuration(s) indicated by the SCI.

Figure 5:
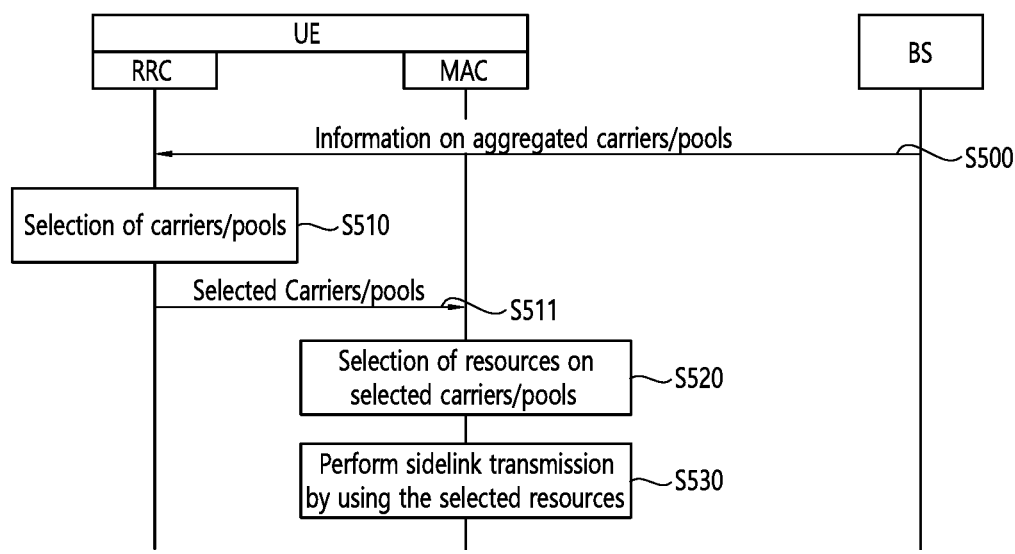
FIG. 5 shows an example of a method for selecting a carrier for sidelink transmission according to an embodiment of the present invention.

FIG. 5 shows an example of a method for selecting a carrier for sidelink transmission according to an embodiment of the present invention.

In step S500, the UE receives information on aggregated carriers or aggregated resource pools. The aggregated carriers or aggregated resource pools may be configured per each service (e.g. V2V, V2I, V2P), per each frequency band, or per each band combination. In addition, the aggregated carriers or aggregated resource pools may be mapped to one of Destination ID (e.g. Destination Layer 2 ID), Source ID (e.g. Source Layer 2 ID), or UE Identity. For example, the aggregated carriers or aggregated resource pools may be configured per each Destination ID. The information on the aggregated carriers or aggregated resource pools may be received via system information and/or a dedicated signaling.

In step S510, the UE selects one or more carriers or one or more resource pools among the aggregated carriers or aggregated resource pools. UE RRC may select one or more carriers or one or more resource pools among the aggregated carriers or aggregated resource pools based on one or more of the following aspects.

UE capability of the UE (e.g. supported band combinations)
UE Identity allocated to the UE (e.g. C-RNTI or SAE temporary mobile subscriber identity (S-TMSI))
Source ID allocated to the UE or selected by the UE
Destination ID allocated to the UE or selected by the UE
Congestion level (e.g. CBR), of the indicated carriers.

More specifically, if the network indicates which carriers or resource pools are mapped to a Destination ID and if the UE is interested in (or allocated/configured with) the Destination ID, the UE may randomly select one or more carriers or one or more resource pools mapped to the Destination ID.

Alternatively, if the network indicates N carriers or N resource pools which can be aggregated and mapped to a Destination ID and if the UE is allocated or configured with the Destination ID, the UE may select one or more carriers or one or more resource pools mapped to the Destination ID among N carriers or N resource pools. For example, the selected carrier or the selected resource pool may be the $i^{th}$ carrier or $i^{th}$ resource pool in the list of carriers or the list of resource pools received from the network. The index i may be determined by Equation 1 below.

$$i = \text{Destination ID mod } N \qquad \text{[Equation 1]}$$

Alternatively, if the network indicates N carriers or N resource pools which can be aggregated and if the UE is allocated or configured with the Source ID, the UE may select one or more carriers or one or more resource pools mapped to the Source ID among N carriers or N resource pools. For example, the selected carrier or the selected resource pool may be the $i^{th}$ carrier or $i^{th}$ resource pool in the list of carriers or the list of resource pools received from the network. The index i may be determined by Equation 2 below.

$$i = \text{Source ID mod } N \qquad \text{[Equation 2]}$$

Alternatively, if the network indicates N carriers or N resource pools which can be aggregated and if the UE is allocated or configured with a UE ID, the UE may select one or more carriers or one or more resource pools mapped to the UE ID among N carriers or N resource pools. For example, the selected carrier or the selected resource pool may be the $i^{th}$ carrier or $i^{th}$ resource pool in the list of carriers or the list of resource pools received from the network. The index i may be determined by Equation 3 below.

$$i = \text{UE ID mod } N \qquad \text{[Equation 3]}$$

In step S511, UE RRC informs UE MAC of the selected carriers or the selected resource pools.

In step S520, UE MAC selects sidelink resources on the selected carrier(s) or the selected resource pool(s).

In step S530, the UE performs sidelink transmission by using the selected resource. Specifically, the UE may transmit SCI and/or data on the selected sidelink resources. Furthermore, the UE may monitor or receive SCI on the selected carrier(s) or the selected resource pool(s), and then, the UE may receive data on the carrier(s) or the resource pool(s) indicated by the SCI.

Figure 6:
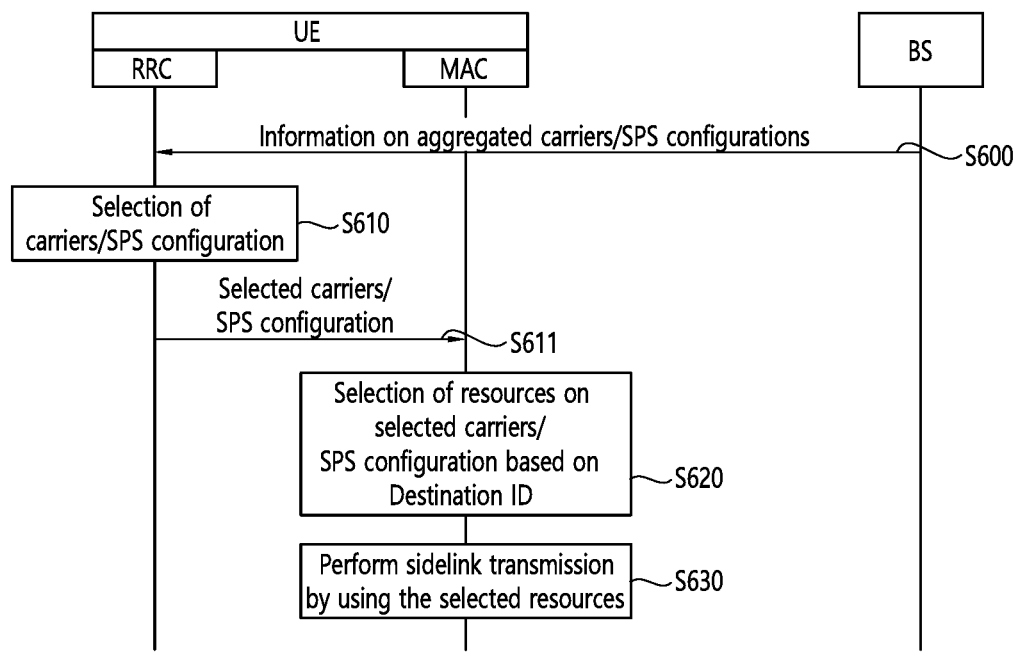
FIG. 6 shows an example of a method for selecting a carrier for sidelink transmission according to an embodiment of the present invention.

FIG. 6 shows an example of a method for selecting a carrier for sidelink transmission according to an embodiment of the present invention. FIG. 6 shows that a resource pool in FIG. 5 is replaced by a SPS configuration. That is, the UE selects one or more carriers of one or more SPS configurations, or one or more SPS configurations among the indicated carriers or SPS configurations.

In step S600, the UE receives information on aggregated carriers or aggregated SPS configurations. The aggregated carriers or aggregated SPS configurations may be configured per each service (e.g. V2V, V2I, V2P), per each frequency band, or per each band combination. In addition, the aggregated carriers or aggregated SPS configurations may be mapped to one of Destination ID (e.g. Destination Layer 2 ID), Source ID (e.g. Source Layer 2 ID), or UE Identity. For example, the aggregated carriers or aggregated SPS configurations may be configured per each Destination ID. The information on the aggregated carriers or aggregated SPS configurations may be received via system information and/or a dedicated signaling.

In step S610, the UE selects one or more carriers or one or more SPS configurations among the aggregated carriers or aggregated SPS configurations. UE RRC may select one or more carriers or one or more SPS configurations among the aggregated carriers or aggregated SPS configurations based on one or more of the following aspects.

UE capability of the UE (e.g. supported band combinations)
UE Identity allocated to the UE (e.g. C-RNTI or SAE temporary mobile subscriber identity (S-TMSI))
Source ID allocated to the UE or selected by the UE
Destination ID allocated to the UE or selected by the UE
Congestion level (e.g. CBR), of the indicated carriers.

More specifically, if the network indicates which carriers or SPS configurations are mapped to a Destination ID and if the UE is interested in (or allocated/configured with) the Destination ID, the UE may randomly select one or more carriers or one or more SPS configurations mapped to the Destination ID.

Alternatively, if the network indicates N carriers or N SPS configurations which can be aggregated and mapped to a Destination ID and if the UE is allocated or configured with the Destination ID, the UE may select one or more carriers or one or more SPS configurations mapped to the Destination ID among N carriers or N SPS configurations. For example, the selected carrier or the selected SPS configuration may be the $i^{th}$ carrier or $i^{th}$ SPS configuration in the list of carriers or the list of SPS configurations received from the network. The index i may be determined by Equation 1 described above.

Alternatively, if the network indicates N carriers or N SPS configurations which can be aggregated and if the UE is allocated or configured with the Source ID, the UE may select one or more carriers or one or more SPS configurations mapped to the Source ID among N carriers or N SPS configurations. For example, the selected carrier or the selected SPS configuration may be the $i^{th}$ carrier or $i^{th}$ SPS configuration in the list of carriers or the list of SPS configurations received from the network. The index i may be determined by Equation 2 described above.

Alternatively, if the network indicates N carriers or N SPS configurations which can be aggregated and if the UE is allocated or configured with a UE ID, the UE may select one or more carriers or one or more SPS configurations mapped to the UE ID among N carriers or N SPS configurations. For example, the selected carrier or the selected SPS configuration may be the $i^{th}$ carrier or $i^{th}$ SPS configurations in the list of carriers or the list of SPS configurations received from the network. The index i may be determined by Equation 3 described above.

In step S611, UE RRC informs UE MAC of the selected carriers or the selected SPS configurations.

In step S620, UE MAC selects sidelink resources on the selected carrier(s) or the selected SPS configuration(s), based on a destination ID.

In step S630, the UE performs sidelink transmission by using the selected resource. Specifically, the UE may transmit SCI and/or data on the selected sidelink resources. Furthermore, the UE may monitor or receive SCI on the selected carrier(s) or the selected SPS configuration(s), and then, the UE may receive data on the carrier(s) or the SPS configuration(s) indicated by the SCI.

Figure 7:
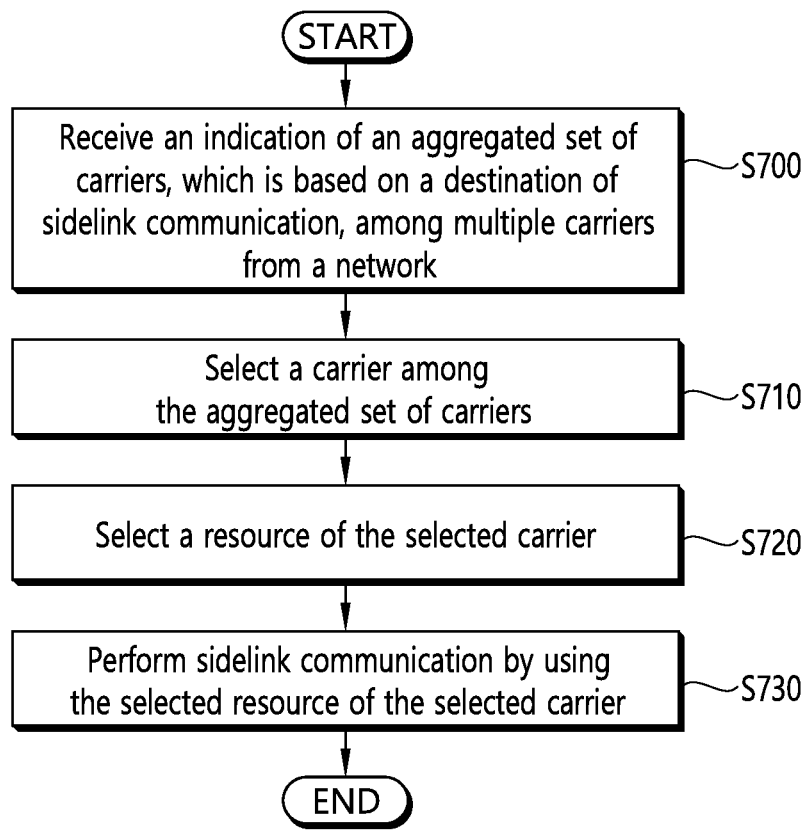
FIG. 7 shows a method for selecting a carrier for a sidelink communication by a UE according to an embodiment of the present invention.

FIG. 7 shows a method for selecting a carrier for a sidelink communication by a UE according to an embodiment of the present invention. FIG. 7 assumes that carrier aggregation and/or carrier selection for sidelink communication is performed based on a destination of sidelink communication. The present invention described above may be applied to this embodiment.

In step S700, the UE receives an indication of an aggregated set of carriers, which is based on a destination of the sidelink communication, among multiple carriers from the network. The aggregated carriers may be configured for each resource pool. Or, the aggregated carriers may be configured for each SPS configuration. The indication of the aggregated set of carriers may be received separately for reception and transmission.

In step S710, the UE selects a carrier among the aggregated set of carriers. The carrier may be selected among the aggregated set of carriers based on the destination of the sidelink communication. The destination of the sidelink communication may be mapped to a Destination Layer 2 ID. In this case, an index of the carrier may correspond to a result of a modulo operation of the Destination Layer 2 ID and a number of carriers in the aggregated set of carriers.

In step S720, the UE selects a resource of the selected carrier. In step S730, the UE performs the sidelink communication by using the selected resource of the selected carrier. The performing the sidelink communication may comprise transmitting at least one of SCI or data on the selected resource of the selected carrier. The performing the sidelink communication may comprise receiving SCI on the selected resource of the selected carrier, and receiving data on a carrier indicated by the SCI.

Figure 8:
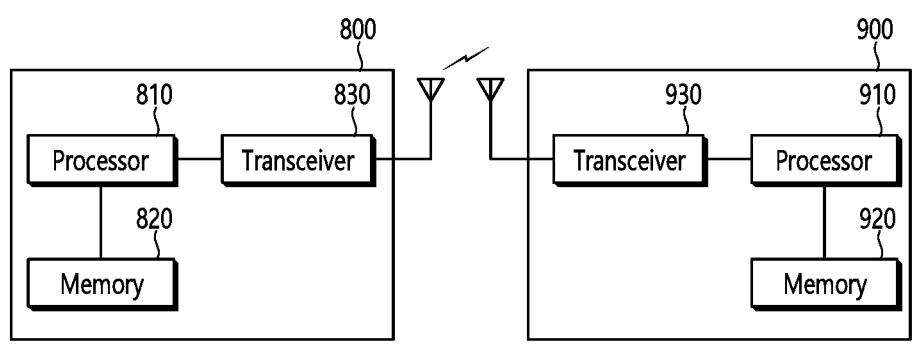
FIG. 8 shows a wireless communication system to implement an embodiment of the present invention.

FIG. 8 shows a wireless communication system to implement an embodiment of the present invention.

A UE 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A network node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing a sidelink communication by a first user equipment (UE) in a wireless communication system, the method comprising:
    receiving system information including information on a first aggregated set of carriers and information on a second aggregated set of carriers from the network;
    selecting, by radio resource control (RRC) layer of the first UE, a first carrier among the first aggregated set of carriers and a second carrier among the second aggregated set of carriers;
    selecting, by medium access control (MAC) layer of the first UE, a first resource of the first carrier and a second resource of the second carrier;
    transmitting a first sidelink control information (SCI) to a second UE through the first resource of the first carrier; and
    receiving a second SCI from a third UE through the second resource of the second carrier,
    wherein the first aggregated set of carriers is related to a destination of the transmission of the first SCI,
    wherein the second aggregated set of carriers is related to a destination of the reception of the second SCI,
    wherein the first carrier is selected among the first aggregated set of carriers based on a result of a first modulo operation based on a first Destination Layer 2 identifier (ID) for the transmission of the first SCI and a number of carriers in the first aggregated set of carriers, and
    wherein the second carrier is selected among the second aggregated set of carriers based on a result of a second modulo operation based on a second Destination Layer 2 ID for the reception of the second SCI and a number of carriers in the second aggregated set of carriers.

2. The method of claim 1, wherein the first aggregated set of carriers or the second aggregated set of carriers is configured for each resource pool.

3. The method of claim 1, wherein the first aggregated set of carriers or the second aggregated set of carriers is configured for each semi-persistent scheduling (SPS) configuration.

4. The method of claim 1, wherein data related to the first SCI is transmitted from the first UE to the second UE through the first resource.

5. The method of claim 1, wherein data related to the second SCI is transmitted from the third UE to the first UE through the second resource.

6. The method of claim 1, wherein the first UE is in communication with at least one of a mobile device, a network, and/or autonomous vehicles other than the first UE.

7. The method of claim 1, wherein the first carrier is selected based on both the result of the first modulo operation and channel busy ratio (CBR) of the first aggregated set of carriers.

8. The method of claim 1, wherein the second carrier is selected based on both the result of the second modulo operation and CBR of the second aggregated set of carriers.

9. The method of claim 1, wherein the first carrier is selected based on both the result of the first modulo operation and a third modulo operation based on a first Source Layer 2 identifier (ID) for the transmission of the first SCI and the number of carriers in the first aggregated set of carriers.

10. The method of claim 1, wherein the second carrier is selected based on both the result of the second modulo operation and a fourth modulo operation based on a second Source Layer 2 ID for the reception of the second SCI and the number of carriers in the second aggregated set of carriers.

11. A first user equipment (UE) performing sidelink communication in a wireless communication system, the first UE comprising:
    a memory;
    a transceiver; and
    a processor, operably coupled to the memory and the transceiver, that:
    controls the transceiver to receive system information including information on a first aggregated set of carriers and information on a second aggregated set of carriers from the network;
    selects, by radio resource control (RRC) layer of the first UE, a first carrier among the first aggregated set of carriers and a second carrier among the second aggregated set of carriers;
    selects, by medium access control (MAC) layer of the first UE, a first resource of the first carrier and a second resource of the second carrier;
    controls the transceiver to transmit a first sidelink control information (SCI) to a second UE through the first resource of the first carrier; and
    controls the transceiver to receive a second SCI from a third UE through the second resource of the second carrier,
    wherein the first aggregated set of carriers is related to a destination of the transmission of the first SCI,
    wherein the second aggregated set of carriers is related to a destination of the reception of the second SCI,
    wherein the first carrier is selected among the first aggregated set of carriers based on a result of a first modulo operation based on a first Destination Layer 2 identifier (ID) for the transmission of the first SCI and a number of carriers in the first aggregated set of carriers, and
    wherein the second carrier is selected among the second aggregated set of carriers based on a result of a second modulo operation based on a second Destination Layer 2 ID for the reception of the second SCI and a number of carriers in the second aggregated set of carriers.

12. The first UE of claim 11, wherein the first aggregated set of carriers or the second aggregated set of carriers is configured for each resource pool.

13. The first UE of claim 11, wherein the first aggregated set of carriers or the second aggregated set of carriers is configured for each semi-persistent scheduling (SPS) configuration.

\* \* \* \* \*